United States Patent [19]

Haruta

[11] 4,405,962
[45] Sep. 20, 1983

[54] CASSETTE LOADING AND UNLOADING APPARATUS

[75] Inventor: Masao Haruta, Kawaguchi, Japan

[73] Assignee: Sony Corporation, Tokyo, Japan

[21] Appl. No.: 300,961

[22] Filed: Sep. 10, 1981

[30] Foreign Application Priority Data

Sep. 12, 1980 [JP] Japan .............................. 55/127408
Sep. 12, 1980 [JP] Japan ......................... 55/131022[U]

[51] Int. Cl.³ ........................ G03B 1/04; G11B 15/00
[52] U.S. Cl. .................................. 360/96.6; 242/198
[58] Field of Search ........ 242/197, 198, 206, 208–210; 360/96.1, 96.5, 96.6, 132, 104, 105

[56] References Cited

U.S. PATENT DOCUMENTS 3,893,186  7/1975  Yoshii ................................. 360/105
3,902,680  9/1975  Neff .................................... 242/198
3,904,149  9/1975  Suzuki ................................ 242/198

Primary Examiner—Leonard D. Christian
Attorney, Agent, or Firm—Lewis H. Eslinger; Alvin Sinderbrand

[57] ABSTRACT

A cassette loading and unloading mechanism for use in a recording and reproducing apparatus includes a chassis assembly, a cassette holder pivotally mounted on the assembly and adapted to be pivoted between a first loading position and a second operative position, wherein the cassette is adapted to be inserted into the cassette holder to a loaded position in response to a pushing force applied thereto when the cassette holder is in the first loading position; a holder lever adapted to engage the cassette holder to retain the latter in the first loading position; a torsion spring adapted to bias the cassette holder to the second operative position when the holder lever is disengaged from the cassette holder; a threading arm rotatably mounted to the chassis assembly and biased from a first inactive position to a second active position by the cassette when the latter is inserted into the cassette holder to the loaded position; a release lever engaged by the threading arm when the latter is biased to the second active position; and a tension spring connected to the threading arm to bias the threading arm and the release lever toward the first inactive position when the cassette has been inserted into the cassette holder to the loaded position and when the pushing force applied to the cassette has been reduced below a first value, wherein the release lever disengages the holder lever from the cassette holder and the torsion spring biases the cassette holder to the second operative position.

14 Claims, 27 Drawing Figures

CASSETTE LOADING AND UNLOADING APPARATUS

BACKGROUND OF THE INVENTION

1. Field of the Invention

This invention relates generally to apparatus for recording and/or reproducing information signals and, more particularly, is directed to a mechanism for loading and unloading a magnetic tape cassette into and from apparatus for recording and/or reproducing information signals.

2. Description of the Prior Art

Apparatus for recording and/or reproducing information signals from a magnetic tape disposed in a tape cassette are well-known in the art. Such apparatus generally includes a mechanism for loading and unloading the tape cassette into and out of operative engagement with a tape drive mechanism, whereby the magnetic tape in the cassette is longitudinally advanced past a magnetic recording/reproducing head. Generally, the cassette loading and unloading mechanism includes a cassette holder into which the cassette is disposed and which is adapted to occupy a first loading position and a second operative position. When the cassette holder is in its loading position, the tape cassette can be inserted into the holder or ejected therefrom, and when the cassette holder is in its operative position, the tape cassette is firmly held therein to be engaged by the tape drive mechanism which may be comprised of a capstan drive assembly and two reel drive shafts. In particular, when the cassette holder, and thereby the tape cassette, are moved into the operative position, the reel drive shafts engage with the reels of the cassette and the capstan drive assembly enters corresponding openings provided in the cassette to engage with the tape therein.

Examples of known cassette loading and unloading mechanisms are disclosed in U.S. Pat. Nos. 3,752,488 and 3,904,149. In these latter mechanisms, a locking arm normally engages and retains the cassette holder in the first loading position. The locking arm is disengaged from the cassette holder by the tape cassette which is inserted therein and, at such time, the cassette holder, which is no longer restrained, is biased by a spring connected thereto into its operative position. With the above arrangement, the locking arm is pivotally mounted to a fixed chassis for engaging with and disengaging from the cassette holder. However, because of slight differences in size between different cassette holders, errors may result in the position at which the locking arm disengages from the cassette holder. Accordingly, with such mechanisms, the locking arm is generally constructed to provide an allowance in the position at which it is pivoted to the chassis. This allowance, however, may result in positional errors with respect to the engagement of the reels of the tape cassette by the reel drive shafts, that is, the cassette holder may be moved into its operative position when the tape cassette is not completely disposed therein. In such case, the reel drive shafts will have an undesirable mechanical force imparted thereto when engaging with the reels of the tape cassette.

OBJECTS AND SUMMARY OF THE INVENTION

Accordingly, it is an object of this invention to provide a cassette tape recording and/or reproducing apparatus that avoids the above-described difficulties encountered with the prior art.

More particularly, it is an object of this invention to provide a mechanism for loading and unloading a tape cassette in a recording and/or reproducing apparatus in a precise, easy and quick manner.

It is another object of this invention to provide a mechanism for loading and unloading a cassette into a recording and/or reproducing apparatus in which the reels of the cassette are smoothly engaged with the reel driving shafts without any undesirable mechanical force being exerted on the shafts.

In accordance with an aspect of this invention, a cassette loading and unloading mechanism for use in an information signal recording and/or reproducing apparatus includes support means; cassette holding means mounted on the support means and adapted to move between a first loading position and a second operative position, wherein a cassette is adapted to be inserted into the cassette holding means to a loaded position in response to a force applied to the cassette when the cassette holding means is in the first loading position; retention means adapted to engage the cassette holding means to retain the latter in the first loading position; first biasing means for biasing the cassette holding means to the second operative position from the first loading position when the retention means is disengaged from the cassette holding means; and means for disengaging the retention means from the cassette holding means only after the cassette has been inserted to the loaded position and the force applied to the cassette has been reduced below a first value.

The above, and other, objects, features and advantages of the present invention will become readily apparent from the ensuing detailed description of an illustrative embodiment of the invention which is to be read in connection with the accompanying drawings.

DETAILED DESCRIPTION OF A PREFERRED EMBODIMENT

Figure 1A:
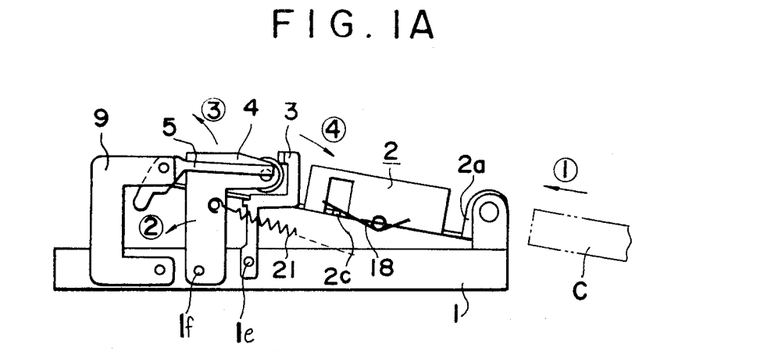
FIG. 1A is a side plan view of a cassette loading and unloading mechanism according to one embodiment of the present invention, and which is illustrated in a first loading position.
Figure 1B:
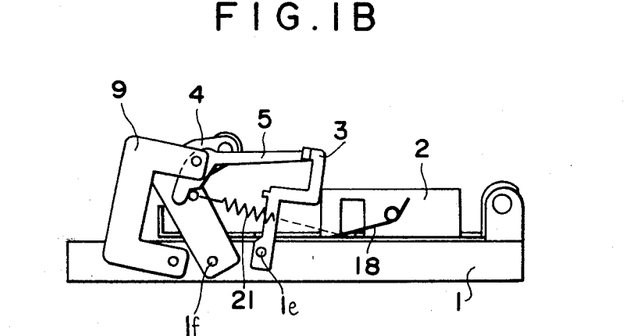
FIG. 1B is a side plan view of the cassette loading and unloading mechanism of FIG. 1A in a second operative position.

Referring to the drawings and detail, and initially to FIGS. 1A and 1B thereof, there is shown a basic embodiment of a cassette loading and unloading mechanism according to this invention that can be employed in a tape cassette recording and/or reproducing apparatus. In general, the cassette loading and unloading mechanism is comprised principally of a main chassis 1, a cassette holder 2, a holder or retention lever 3, a threading arm 4, a release lever 5, a release lever holding plate 9, a first torsion spring 18 and a second tension spring 21.

Figure 2:
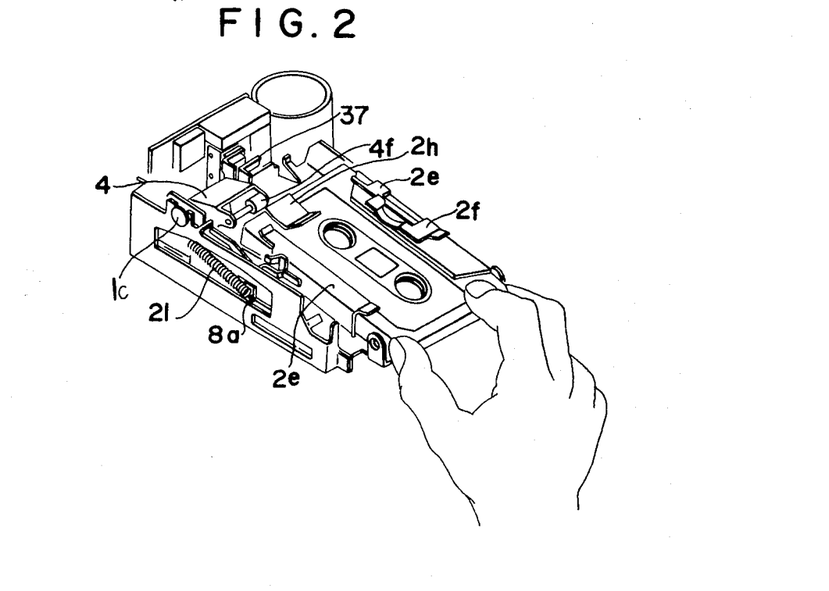
FIG. 2 is a perspective view of the cassette loading and unloading mechanism of FIG. 1A with a cassette loaded therein.
Figure 3:
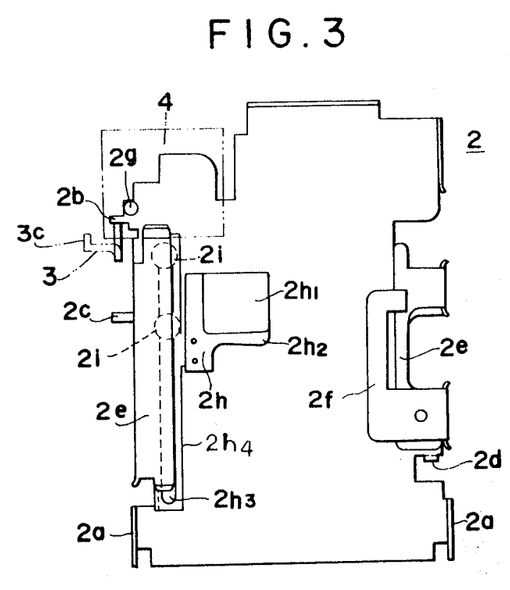
FIG. 3 is a top plan view of the cassette holder of the cassette loading and unloading mechanism of FIG. 1A.
Figure 4:
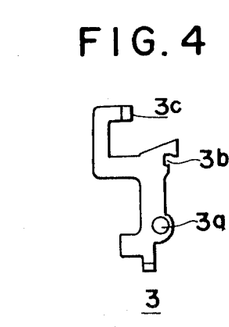
FIG. 4 is a side plan view of the holder lever of the cassette loading and unloading mechanism of FIG. 1A.
Figure 5A:
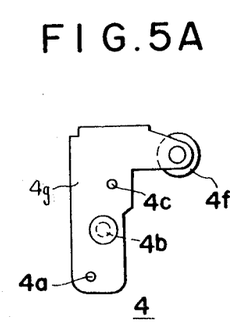
FIGS. 5A and 5B are opposite side plan views of the threading arm of the cassette loading and unloading mechanism of FIG. 1A.
Figure 5B:
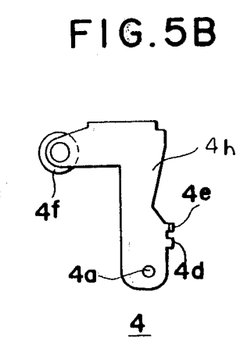
Figure 6:
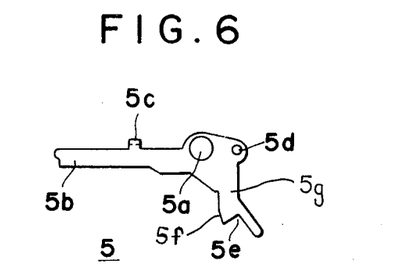
FIG. 6 is a side plan view of the release lever of the cassette loading and unloading mechanism of FIG. 1A.

In order to better understood the operation of the present invention, the above and other elements and connections of the cassette loading and unloading mechanism according to this invention will now be described in detail with reference to FIGS. 2–19. In particular, and referring first to FIGS. 2 and 3, cassette holder 2 is provided with connecting lugs 2a at the front end thereof and at which the cassette holder is pivotally mounted to main chassis 1. The cassette holder also includes an engaging lug 2b at one side for engaging with holder lever 3 and a projection 2c on the same side for effecting movement of the cassette holder between a first loading position and a second operative position, as will be discussed in further detail hereinafter. In addition, an engaging lug 2d is provided on the opposite side thereof for effecting movement of a head chassis assembly 13 from an inoperative to an operative tape engaging position. Cassette holder 2 also includes cassette guide members 2e located at opposite sides thereof and a cassette guide pin 2g located at one side thereof for guiding the cassette during the loading and unloading operations. A contacting member 2f is also provided for exerting a downward force on the tape cassette when the latter is loaded into cassette holder 2.

The cassette holder also includes a sliding member 2h having upper and lower surface plates $2h_1$ and $2h_2$ which hold or maintain the end of the tape cassette that is inserted into cassette holder 2 therebetween. Sliding member 2h is also comprised of an elongated member $2h_4$ attached to the upper and lower surface plates $2h_1$ and $2h_2$ and having an elongated slot $2h_3$ within which are disposed two guide pins 2i projecting upwardly from cassette holder 2. In this manner, sliding member 2h is adapted for forward and backward longitudinal movement, as viewed in FIG. 3, when the tape cassette is loaded and unloaded from the cassette holder. Accordingly, during the loading operation, the tape cassette is inserted between guide members 2e, with contacting member 2f exerting a downward force thereon. As the cassette is pushed further into cassette holder 2, the inserted end thereof is engaged between the upper and lower surface plates $2h_1$ and $2h_2$ of sliding member 2h so as to push this latter member rearwardly, as viewed in FIG. 3, by means of elongated member $2h_4$ and guide pins 2i. The tape cassette is further guided, near the end of the loading operation, by guide pin 2g.

A description of holder or retention lever 3 will now be given with respect to FIGS. 1A, 1B, 3 and 4. In particular, holder lever 3 is rotatably mounted to main chassis 1 by means of a pin or axle 1e projecting from main chassis 1 into an aperture 3a thereof. Lever 3 is normally biased in the counterclockwise direction, as viewed in FIG. 1A, by a torsion spring (not shown), so that an engaging cut-out 3b of lever 3 mates with engaging lug 2b of cassette holder 2 to retain or hold the latter in the first loading position of FIG. 1A, that is, to prevent the downward pivotal movement of cassette holder 2 about connecting lugs 2a. Lever 3 also includes an actuating portion 3c at the upper end thereof, the operation of which will be described hereinafter.

The threading arm 4, as shown in FIGS. 1A, 1B, 5A, 5B and 7 includes two support arms 4g and 4h which are rotatably mounted to main chassis 1 by means of a pin or axle 1f projecting from main chassis 1 and extending into lower apertures 4a of support arms 4g and 4h. A roller 4f is rotatably mounted between the upper ends of support arms 4g and 4h. In addition, threading arm 4 is normally biased in the clockwise direction as viewed in FIG. 1A, by a torsion spring (not shown) which is connected to an engaging lug 4e at the lower end of support arm 4h. In this manner, roller 4f is normally biased into contact with sliding member 2h of cassette holder 2. However, the rotational movement of threading arm 4 in this direction is restricted by an engaging lug 4d at the lower end of support arm 4h which is biased into contact with the underside or bottom of main chassis 1. In addition, threading arm 4 includes engaging pins 4b and 4c extending from the outer side of support arm 4g, and the relationship of these pins with other elements will be described hereinafter.

A release lever 5 of an L-shaped configuration, which is adapted to engage with threading arm 4 during the loading operation, is shown in detail in FIGS. 1A, 1B, 6 and 10. In particular, release lever 5 is rotatably mounted to a sub-chassis 11, which is fixed to main chassis 1, by means of a pin 1c extending through sub-chassis 11 and through an aperture 5a of release lever 5. As will be discussed in more detail hereinafter, pin 1c is also linearly movable in the horizontal direction in sub-chassis 11 and, as a result, release lever 5, besides being rotatable about pin 1c is also linearly movable in the horizontal direction.

Release lever 5 also includes a horizontally extending release arm 5b which, when the cassette is fully inserted into cassette holder 2 to a cassette loaded position, operates to disengage cut-out 3b of holder lever 3 from lug 2b of cassette holder 2. Release arm 5b includes a laterally extending projection or lug 5c at the upper end thereof which is adapted to mate with a guide lever 10, as will be discussed in detail hereinafter. Release lever 5 also includes a downwardly extending arm 5g having a cam portion 5f which leads into an engaging portion 5e at the lower end thereof, engaging portion 5e mating with pin 4b of threading arm 4 when the cassette is fully inserted into cassette holder 2. A small aperture 5d is provided at the upper end of arm 5g and a spring 20 is connected between main chassis 1 and aperture 5d. In this manner, release lever 5 is normally biased linearly to the right and rotatably in the clockwise direction, as viewed in FIG. 10.

Figure 8:
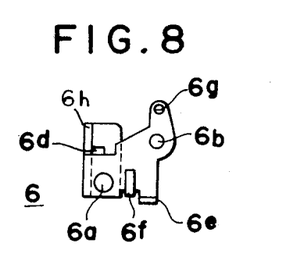
FIG. 8 is a side plan view of the rotatable lever of the cassette loading and unloading mechanism of FIG. 1A.
Figure 10:
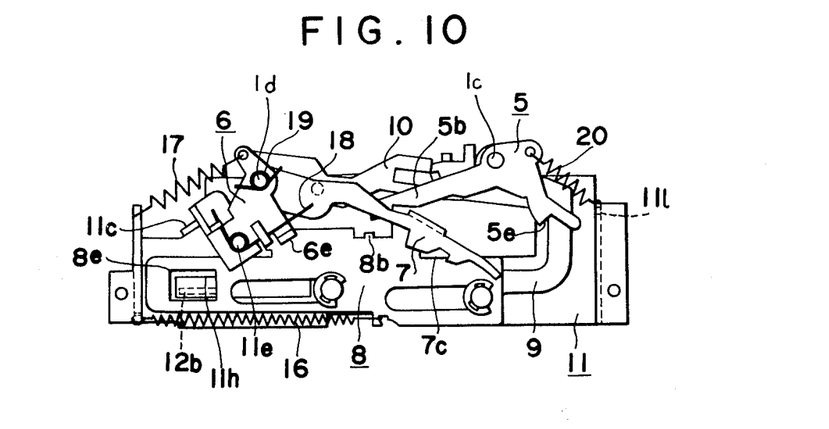
FIG. 10 is a more detailed side plan view of the cassette loading and unloading mechanism of FIG. 1A.

Referring now to FIGS. 8 and 10, a rotatable lever 6 of the cassette loading and unloading mechanism, which is of a U-shaped configuration, includes apertures 6a through which a support pin 11e from sub-chassis 11 is inserted for rotatably mounting rotatable lever 6 thereabout. Wrapped about support pin 11e is a torsion spring 18 with a first end thereof engaged by a spring holder projection 6d of rotatable lever 6 and the other second end engaged by a spring guide 6f of rotatable lever 6. Accordingly, torsion spring 18 provides no rotational force to rotatable lever 6 when the latter is in its inoperative position, that is, when cassette holder 2 is in its first loading position. However, when rotatable lever 6 is rotated in the clockwise direction, as viewed in FIG. 10, the second end of torsion spring 18 engages projection 2c of cassette holder 2 for downwardly rotating the latter about connecting lugs 2a to move cassette holder 2 into its second operative position. Rotatable lever 6 also includes a spring holding aperture 6g formed at its upper end and a tension spring 17 which is connected between an aperture 11k of sub-chassis 11 and aperture 6g normally bias rotatable lever 6 in the counterclockwise direction, as viewed in FIG. 10, about support pin 11e. However, a stop 6h at the upper end of rotatable lever 6 abuts against a projection 11c of sub-chassis 11 when cassette holder 2 is in its first loading position to limit the extent of rotation of rotatable lever 6 caused by tension spring 17. In addition, rotatable lever 6 includes an aperture 6b at its upper end, the purpose of which will be explained later in this application, and a projecting lug 6e at the lower end thereof for returning cassette holder 2 to its first loading position from its second operative position by means of the rotational force imparted by spring 17.

Figure 9:
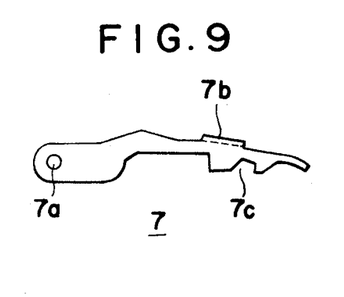
FIG. 9 is a side plan view of the joint lever of the cassette loading and unloading mechanism of FIG. 1A.

As shown in FIGS. 9 and 10, a joint lever 7 of an elongated configuration is rotatably connected to rotatable lever 6 by a connecting pin 1d inserted in aperture 6b and an aperture 7a at one end of joint lever 7. A torsion spring 19 which is wrapped about connecting pin 1d and has one end thereof secured to rotatable lever 6 and the opposite end thereof secured to joint lever 7, as shown in FIG. 10, normally biases joint lever 7 in the clockwise direction, as viewed in FIG. 10, with respect to rotatable lever 6. Joint lever 7 further includes a horizontally extending engaging lug 7b at the upper end thereof and an engaging cut-out portion 7c at the lower end thereof which mates with engaging pin 4b of threading arm 4. In this manner, when a cassette is inserted into cassette holder 2 to bias threading arm 4 in the counter-clockwise direction, as viewed in FIG. 1B, engaging pin 4b mates with cut-out portion 7c of joint lever 7 to pull the latter to the right, as viewed in FIG. 10. This, in turn, causes rotatable lever 6 to rotate in the clockwise direction, as viewed in FIG. 10, against the force of tension spring 17, whereby torsion spring 18 exerts a downward force on projection 2c of cassette holder 2. It is to be remembered, however, that at this time, cut-out 3b of holder lever 3 is in mating engagement with lug 2b of cassette holder 2 to prevent the latter from moving downwardly into its second operative position. When the cassette has been pushed as far as it can go into cassette holder 2, that is, to a cassette loaded position, engaging pin 4c of threading arm 4 mates with engaging portion 5e of release lever 5. When the force applied to the cassette to push it into cassette holder 2 is reduced below a first value or is stopped altogether, the torsion spring associated with threading arm 4 causes the latter to rotate backward slightly towards its original position, thereby linearly translating release lever 5, by means of pin 1c, towards the front or open end of cassette holder 2. Release arm 5b thereby engages actuating portion 3c of holder lever 3 to bias the latter in the clockwise direction, as viewed in FIG. 1B, about pin 1e. This, in turn, causes cut-out 3b to release projection 2c, whereby torsion spring 18 biases cassette holder 2 downwardly into its second operative position. It should be appreciated that, unlike the aforementioned prior art mechanisms, it is the releasing of the cassette after it has been pushed into the cassette holder that enables cassette holder 2 to move into its second operative position so that accurate and quick alignment of the reels of the cassette with the reel drive shafts is achieved.

Figure 11:
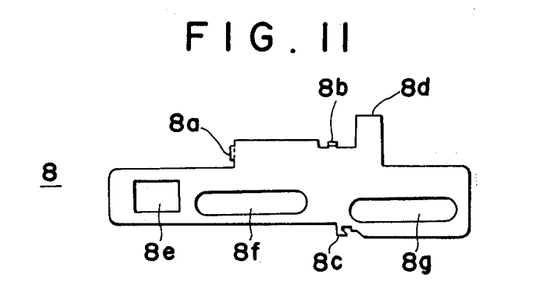
FIG. 11 is a side plan view of the sliding plate of the cassette loading and unloading mechanism of FIG. 1A.

Referring now to FIGS. 10 and 11, there is shown a sliding plate 8 of an elongated configuration having center and rear elongated slots 8f and 8g at the lower end thereof into which are inserted pins 11f and 11g, respectively, of sub-chassis 11 for slidably mounting sliding plate 8 in the horizontal direction, as viewed in FIG. 10. A rectangular slot 8e is also provided at the forward end of the sliding plate for engaging with a chassis back lever 12, as will hereinafter be discussed. Sliding plate 8 is also provided with an engaging lug 8a at the forward and upper end thereof and at which one end of a tension spring 21 is attached, the other end of the spring being attached to pin 4c of threading arm 4. In this manner, when threading arm 4 is rotated in the counterclockwise direction, as viewed in FIG. 1B, sliding plate 8 is slidably moved therewith along pins 11f and 11g towards the rear of cassette holder 2. In addition, an engaging projection 8c at the lower end of sliding plate 8 is engaged by one end of a tension spring 16, the other end of which is connected to an aperture 11m at the front end of sub-chassis 11. In this manner, when sliding plate 8 has been slidably moved toward the rear of cassette holder 2, spring 16 functions to bias sliding plate 8, and thereby, threading arm 4 through spring 21, towards the front end of cassette holder 2. In addition, sliding plate 8 includes an engaging lug 8b at the upper end thereof and a vertical projection 8d also at the upper end thereof adjacent engaging lug 8b.

Figure 12:
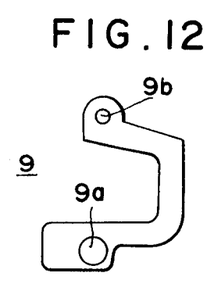
FIG. 12 is a side plan view of the release lever holding plate of the cassette loading and unloading mechanism of FIG. 1A.

The cassette loading and unloading mechanism according to this invention further includes a release lever holding plate 9, as shown in FIGS. 1A, 1B and 12, which is of a generally U-shaped configuration with two horizontally extending arms connected together by a connecting piece. The lower horizontally extending arm includes an aperture 9a at its free end through which pin 11g of sub-chassis 11 also extends for rotatably mounting holding plate 9 thereabout. The upper horizontally extending arm also includes an aperture 9b through which pin 1c extends for limiting the rotational movement of holding plate 9 about pin 11g. Holding plate 9 therefore comprises means by which pin 1c can be mounted to sub-chassis 11 in a linearly movable manner.

Figure 13:
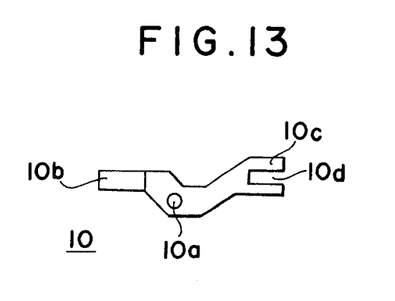
FIG. 13 is a side plan view of the guide lever of the cassette loading and unloading mechanism of FIG. 1A.

As shown in FIGS. 10 and 13, an elongated guide lever 10 is pivotally mounted to the upper end of sub-chassis 11 by a pin 11b which extends through an aperture 10a approximately midway between the ends of guide lever 10. The rearward extending end of guide lever 10 includes a bifurcated section 10d having an upper fork arm 10c thereof and in which projection 5c of release lever 5 is guided. The opposite end 10b of guide lever 10 rests upon pin 1d to limit the rotational movement of guide lever 10 about pin 11b when cassette holder 2 is in its first loading position. In this manner, since engaging lug 5c of release lever 5 is disposed within the bifurcated section 10d of guide lever 10, release lever 5 is limited in its rotational movement in the clockwise direction, as viewed in FIG. 10, which rotational movement is caused by the tensioning force of spring 20. In other words, when cassette holder 2 is in its first loading position, engaging lug 5c abuts against upper fork arm 10c.

Figure 14:
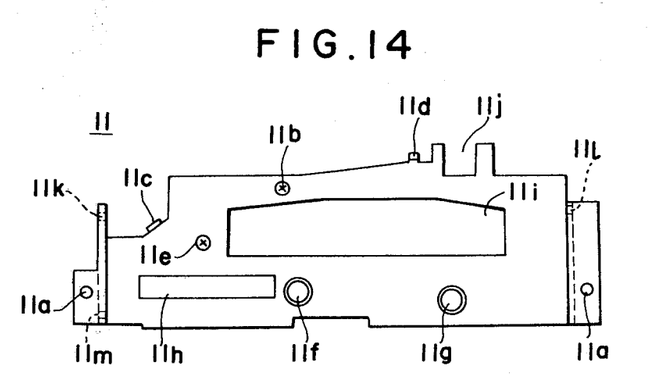
FIG. 14 is a side plan view of the sub-chassis of the cassette loading and unloading mechanism of FIG. 1A.

Referring now to FIGS. 10 and 14, the aforementioned sub-chassis 11 is fixedly secured to main chassis 1 along one side of cassette holder 2 by means of screws (not shown) inserted within apertures 11a at opposite ends of sub-chassis 11 and which also extend into respective apertures in main chassis 1. As previously discussed, a pin 11b extends from the upper end of sub-chassis 11 into aperture 10a of guide lever 10 for rotatably supporting the latter element, and pin 11e rotatably supports rotatable lever 6 thereabout. Also, as previously discussed, projection 11c is provided at the forward end of sub-chassis 11 and against which one end of rotatable lever 6 abuts so as to limit the rotational movement of lever 6 about pin 11e in the counter-clockwise direction, as viewed in FIG. 10, which rotatable movement is caused by spring 17 connected between aperture 11k of sub-chassis 11 and aperture 6g of rotatable lever 6. Directly below aperture 11k is located aperture 11m at the front end of sub-chassis 11 to which is connected one end of spring 16, as aforementioned, the other end of spring 16 being connected to projection 8c of sliding plate 8. Sub-chassis 11 also includes a rectangular cut-out 11j at the upper end and towards the rear thereof in which pin 1c is rotatably and slidably (linearly) mounted, which pin, as aforementioned, extends through aperture 5a of release lever 5 for providing rotational and slidable movement thereto and also through aperture 9b of holding plate 9 for limiting the rotational movement thereof. Holding plate 9, as aforementioned provides for the slidable mounting of pin 1c in cut-out 11j. An aperture 11l is also provided at the extreme rear end of sub-chassis 11 for connecting one end of spring 20 to sub-chassis 11, the other end of which is connected to aperture 5d of release lever 5 for providing a rotational force thereto in the clockwise direction, and a rearward (to the right) force, as viewed in FIG. 10. A horizontal projection 11d is provided adjacent cut-out 11j for limiting the rotational movement of release lever 5 in the clockwise direction, as viewed in FIG. 5, just prior to the time when release lever 5 is engaged by threading member 4, and before cassette holder 2 has dropped into its second operative position. Also, as aforementioned, pins 11f and 11g are provided at the lower end of sub-chassis 11 for slidably supporting sliding plate 8 in the horizontal direction, as viewed in FIG. 10, and pin 11g further rotatably mounts holding plate 9. The sub-chassis also includes a centrally located elongated opening 11i into which pin 4c of threading arm 4, spring 21 and lug 8a of sliding plate 8 extend to permit relative movement of these elements within such opening during operation of the cassette loading and unloading mechanism. Lastly, sub-chassis 11 includes an elongated opening 11h at the lower and front end thereof through which chassis back lever 12 extends, as will be discussed hereinafter.

Figure 15:
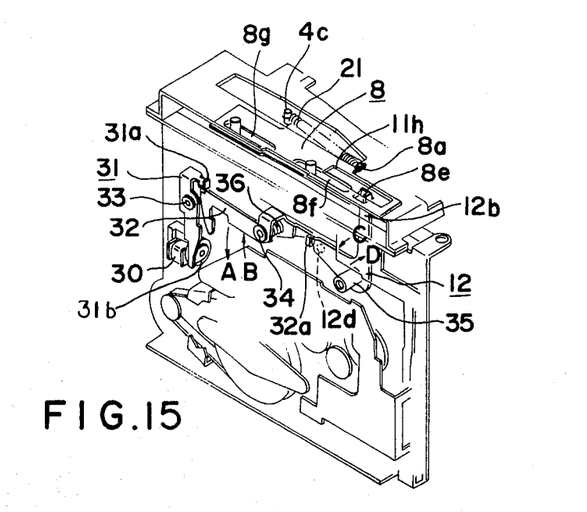
FIG. 15 is a perspective view of the cassette loading and unloading mechanism of FIG. 1A, viewed from the bottom thereof.

Referring now to FIG. 15, there is shown that portion of the cassette loading and unloading mechanism on the underside of main chassis 1 which is used to limit the sliding movement of sliding plate 8. In particular, a solenoid 30 is fixedly secured to main chassis 1 and, whee current is supplied thereto, functions to draw a metal cylinder 31b at one end of a solenoid joint link 31 towards it. Solenoid joint link 31 is pivotally mounted by a pin 33 secured to main chassis 1 and extending through a central aperture of solenoid joint link 31. In this manner, solenoid joint link 31 is rotated in the clockwise direction. as viewed in FIG. 15, during energization of solenoid 30, whereby the opposite engaging end 31a thereof functions to restrict movement of a key lock lever 32. In particular, key lock lever 32 is pivotally mounted to main chassis 1 by a pivot pin 34 and is normally biased in the direction of arrow A in FIG. 15 by a torsion spring 36 wrapped about pivot pin 34 and having one end secured to main chassis 1 and the other end attached to key lock lever 32. When biased by the aforementioned torsion spring, key lock lever 32 abuts against a projecting portion (not shown) of main chassis 1 so as to limit the rotational movement thereof in the direction of arrow A. It should be appreciated that, as shown in FIG. 15, when solenoid 30 causes solenoid joint link 31 to rotate in the clockwise direction, as viewed in FIG. 15, the aforementioned free end of key lock lever 32 is prevented from being rotated in the direction against the force of torsion spring 36, that is, in the direction of arrow B in FIG. 15.

Figure 18:
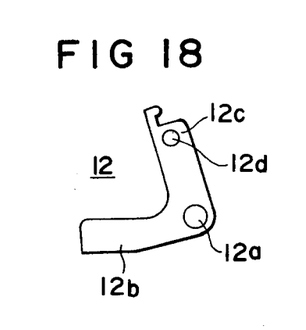
FIG. 18 is a side plan view of the chassis back lever of the cassette loading and unloading mechanism of FIG. 1A.

An L-shaped chassis back lever 12 (FIGS. 15, 18 and 19) is also pivotally mounted to the underside of main chassis 1 by means of a pivot pin 35 inserted within a central aperture 12a of chassis back lever 12. The free end of one arm 12c of chassis back lever 12 is disposed within a hooked end 32a of key lock lever 32. In this manner, when key lock lever 32 is prevented from rotating in the direction of arrow B by solenoid joint link 31, chassis back lever 12 is prevented from rotating in the direction of arrow C in FIG. 15, as a result of the aforementioned relation between the free end of chassis back lever 12 and the hook end 32a of key lock lever 32. In addition, arm 12c includes an upstanding pin 12d extending through main chassis 1, as will be discussed hereinafter. The free end of the other arm 12b of chassis back lever 12 is disposed within slot 8e of sliding plate 8 and within opening 11h of sub-chassis 11. The operations of the above-described elements in FIG. 15 in relation to the aforementioned elements described in regard to FIGS. 1–14, will be described later in this application.

Figure 7:
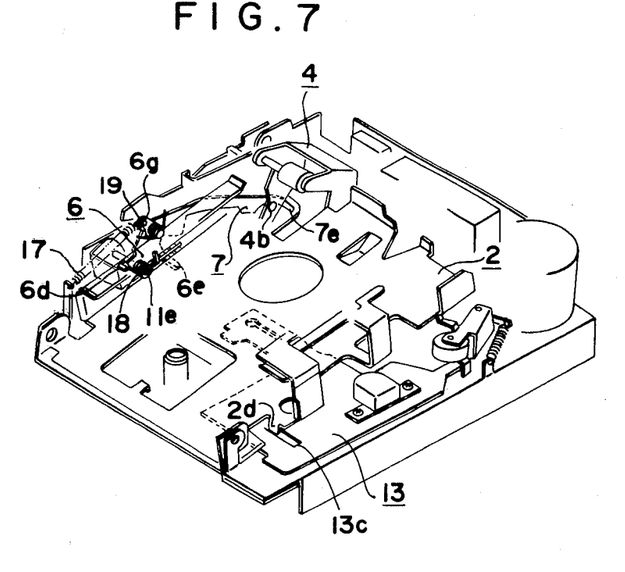
FIG. 7 is another perspective view of the cassette loading and unloading mechanism of FIG. 1A.
Figure 16:
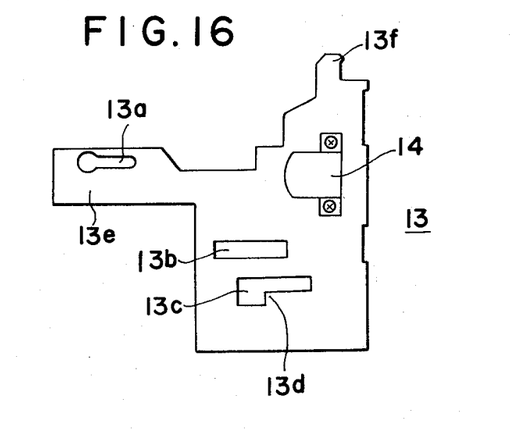
FIG. 16 is a top plan view of the head chassis assembly of the cassette loading and unloading mechanism of FIG. 1A.
Figure 17A:
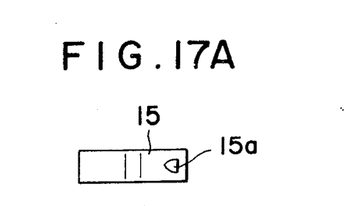
FIG. 17A is a top plan view of the leaf spring of the cassette loading and unloading mechanism of FIG. 1A.
Figure 17B:
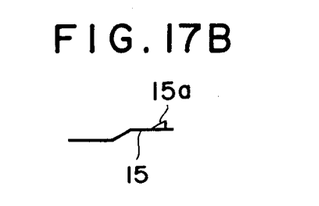
FIG. 17B is a side plan view of the leaf spring of FIG. 17A.
Figure 17C:
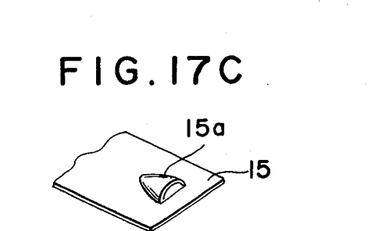
FIG. 17C is a perspective view of a portion of the leaf spring of FIG. 17A.
Figure 19:
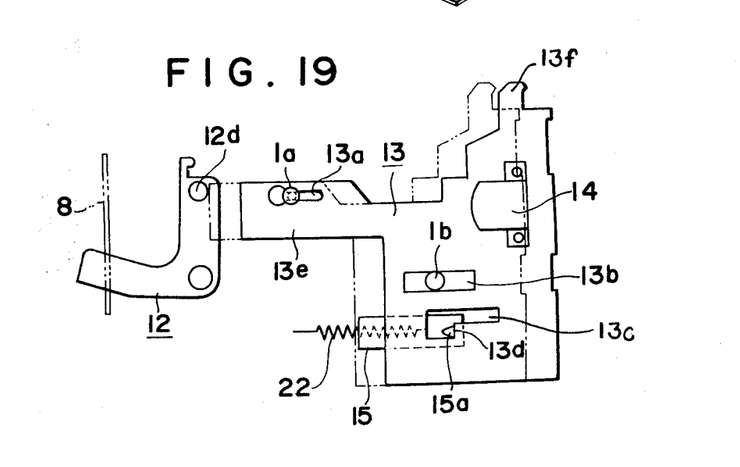
FIG. 19 is a top plan view of a portion of the cassete loading and unloading mechanism of FIG. 1A, illustrating the relationship between the head chassis assembly, the chassis back lever and the leaf spring.

Referring now to FIGS. 7, 16 and 19, a head chassis assembly 13 which has a magnetic reproducing head 14 fixed thereon for reproducing signals from the magnetic tape contained in the cassette, will now be described. In particular, head chassis assembly 13 includes an elongated slot 13a in an arm 13e thereof and an elongated slot 13b in the main body thereof, through which guide pins 1a and 1b from main chassis 1 project for slidably mounting head chassis assembly 13 to main chassis 1. A projection 13f of head chassis assembly 13 engages the pivotal arm of a pinch roller assembly so as to retain the pinch roller assembly out of engagement with a capstan when cassette holder 2 is in its first loading position, that is, when head chassis assembly 13 is in the position shown by solid lines in FIG. 19. At such time, a leaf spring 15 which is mounted to the underside of main chassis 1 is biased upwardly and includes a stopper portion 15a of a half-conical configuration which extends through an opening (not shown) in main chassis 1 and an opening 13c of head-chassis assembly 13 to engage a surface 13d thereat so as to prevent or latch head chassis assembly 13 from moving to the left, as viewed in FIG. 19. Leaf spring 15 is shown in greater detail in FIGS. 17A, 17B and 17C.

When cassette holder 2 is downwardly pivoted about connecting lugs 2a into its second operative position, engaging lug 2d thereof is inserted into the longitudinal portion of opening 13c to bias leaf spring 15 and, in particular, stopper portion 15a thereof, out of engagement with surface 13d. At such time, since head chassis assembly 13 is no longer restrained by leaf spring 15, a tension spring 22 connected between main chassis 1 and head chassis assembly 13 biases head chassis assembly 13 to the left, as shown by the dot-dash line in FIG. 19. Thus, when cassette holder 2 is moved into its second operative position, magnetic head 14 is moved with head chassis assembly 13 into engagement with the magnetic tape in the tape cassette for reproducing information signals therefrom. At the same time, projection 13f no longer restrains the pinch roller assembly so that the latter is pivoted by a spring into engagement with a capstan with the tape pinched therebetween, whereby rotation of the capstan causes the magnetic tape in the cassette to be longitudinally advanced past magnetic head 14. When cassette holder 2 moves from its second operative position to its first loading position in order to remove or eject the tape cassette therefrom, arm 12c of chassis back lever 12 and, more particularly, pin 12d thereon which extends upward through main chassis 1, is rotated in the clockwise direction, as viewed in FIG. 19, to bias or push arm 13e of head chassis assembly 13 to the right, as viewed in FIG. 19. Accordingly, stopper portion 15a of leaf spring 15, which is no longer biased by engaging lug 2d, is once again biased into engagement with surface 13d to maintain head chassis assembly 13 in the position shown by solid lines in FIG. 19.

The operation of the above cassette loading and unloading mechanism will now be described in detail. Before a cassette is loaded into cassette holder 2, the latter is maintained in a first loading position by cut-out 3b of holder lever 3 which engages with engaging lug 2b of cassette holder 2 to prevent the latter from pivoting downward about connecting lugs 2a thereof. The tape cassette C is inserted, in the direction of arrow 1 in FIG. 1A, into the open space in the cassette holder 2, which is in its first loading position. As the cassette is further inserted into cassette holder 2, the rear end of cassette C is engaged between upper and lower surface plates $2h_1$ and $2h_2$ of sliding member $2h$. As cassette C is pushed still further into cassette holder 2 in the direction of arror 1 in FIG. 1A, sliding member $2h$ is moved in the same direction by means of elongated member $2h_4$ and, in turn, abuts against and rotatably biases roller 4f and threading arm 4 in the direction of arrow 2 in FIG. 1A. At this time, the rotation of threading arm 4 causes a switch lever 37 (FIG. 2) to actuate a switch to supply an operating current to solenoid 30. As a result, solenoid joint link 31 is rotated about pin 33 in the clockwise direction, as viewed in FIG. 15, until metal cylinder 31b thereof contacts solenoid 30. At this time, engaging end 31a of solenoid joint link 31 prevents key lock lever 32 from rotating in the direction indicated by arrow B in FIG. 15. Hooked end 32a of key lock lever 32, in turn, prevents the rotation of chassis back lever 12 in the direction of arrow C in FIG. 15, whereby arm 12b of chassis back lever 12 which is engaged in opening 8e of sliding plate 8 permits sliding plate 18 to be moved only slightly in the rearward direction by means of spring 21 until the forward end of opening 8e thereof abuts against arm 12b of chassis back lever 12. Accordingly, spring 21 extending between threading arm 4 and sliding plate 8 is stretched to provide a stored returning force to threading arm 4.

Further, since pin 4b of threading arm 4 engages engaging cut-out portion 7c of joint lever 7, the latter is pulled by threading arm 4 during the rotation thereof in the rearward direction of the mechanism. Accordingly, joint lever 7, through pin 1d, causes rotatable lever 6 to rotate in the clockwise direction, as viewed in FIG. 10, about support pin 11e and against the force of tension spring 17 and torsion spring 19. As a result of such rotation, the end of torsion spring 18 which had previously been biased against engaging lug 6f of rotatable lever 6 is transferred to projection 2c of cassette holder 2 to bias the latter in the downward position about connecting lugs 2a. It is to be remembered, however, that cut-out 3c of holder lever 3, at such time, is still maintained in engagement with engaging lug 2b of cassette holder 2 to prevent the latter from being moved downwardly to its second operative position by torsion spring 18.

Figure 20A:
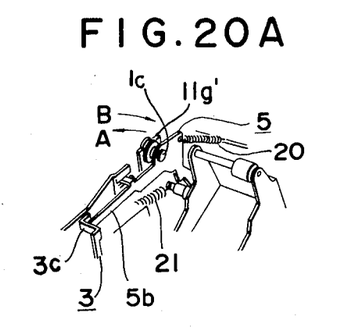
FIGS. 20A, 20B, 21 and 22 are different perspective views of the cassette loading and unloading mechanism of FIG. 1A, used for illustrating the operation thereof.

The rearward movement of joint lever 7 and the rotational movement of rotatable lever 6 cause pin 1d to be moved downwardly in relation to cassette holder 2 so that end 10b of guide lever 10 is no longer restrained by such pin. In this regard, release lever 5 which is rotatably biased about aperture 5a thereof and is maintained against the rear surface of cut-out 11j of sub-chassis 11 by means of tension spring 20, is no longer restrained from rotational movement by bifurcated section 10d of guide lever 10 and is further caused to rotate in the clockwise direction, as viewed in FIG. 10, until restrained by projection 11d of sub-chassis 11. Upon continued rotation of threading arm 4, engaging pin 4c mates with the engaging portion 5e of release lever 5. More particularly, when cassette C is almost fully inserted into cassette holder 2, engaging pin 4c of threading arm 4 abuts against cam portion 5f of release lever 5 to bias the latter in the direction of arrow A in FIG. 20A against the elastic force of spring 20. With further rotation of threading arm 4, engaging pin 4c rides over cam portion 5f, whereby spring 20 rotates release lever 5 back in the direction of arrow B in FIG. 20A (arrow 3 in FIG 1A), and pin 4c engages with engaging portion 5e. In this position, the free end of release arm 5b of release lever 5 is in opposing relation to actuating portion 3c of holder lever 3.

Figure 20B:
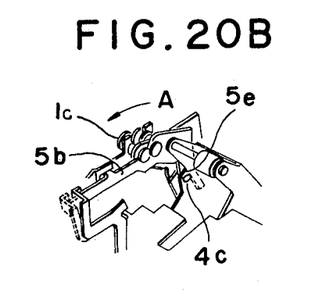

When cassette C has assumed its innermost or furthest position in cassette holder 2, that is, a cassette loaded position, the user releases the cassette so that the pushing force is no longer applied to cassette C. Accordingly, threading arm 4 in rotated slightly back towards its original unbiased position by tension spring 21 which is connected between sliding plate 8 and pin 4c of threading arm 4. Actually, it should be appreciated that tension spring 17, torsion springs 18 and 19 and the torsion spring associated with threading arm 4 also aid in rotating threading arm 4 slightly backward toward its original position. Further, it should be appreciated that it is only necessary for the user to reduce the pushing force to a first value less than that which is necessary for the above springs to rotate threading arm 4 slightly back towards its origingal unbiased position. Since release lever 5 is engaged by pin 4c, release lever 5, and therefore, also holding plate 9, are moved in the forward direction of cassette holder 2, in the direction of arrow A of FIG. 20B, against the action of spring 20. The forward movement of release lever 5 is limited by pin 1c which abuts against the forward surface of cut-out 11j of sub-chassis 11. However, this forward movement results in release arm 5b abutting against actuating portion 3c of holder lever 3 to cause the latter to rotate in the counter-clockwise direction, as viewed by the dashed lines in FIG. 20B (and by arrow 4 in FIG. 1A), so that cut-out 3b thereof becomes disengaged from engaging lug 2b of cassette holder 2. Consequently, cassette holder 2 is rotated downwardly about connecting lugs 2a into its second operative position, as shown in FIG. 1B, by the force of torsion spring 18 which engages with projection 2c of cassette holder 2.

With this latter rotation of cassette holder 2, engaging lug 2d thereof is inserted into opening 13c of head chassis assembly 13 to exert a downward force on leaf spring 15 and to thereby disengage stopper portion 15a thereof from surface 13d of head chassis assembly 13. Head chassis assembly 13 is thereby laterally moved by the force of spring 22 toward cassette holder 2 into the position shown by the dot-dash line in FIG. 19. In particular, spring 22 biases head chassis assembly 13 to the left, as viewed in FIG. 19, until pins 1a and 1b abut against the right-hand ends of slots 13a and 13b of head chassis assembly 13, whereby magnetic head 14 is precisely positioned to contact the magnetic tape so as to be able to reproduce information signals therefrom. In addition, at this time, since projection 13f of head chassis assembly 13 no longer restrains the aforementioned pinch roller assembly, the latter is moved by a spring, along with head chassis assembly 13, so that the magnetic tape is pinched between the pinch roller assembly and a capstan which extends through an opening in the cassette. Rotation of the capstan causes the magnetic tape to be longitudinally advanced past the magnetic head 14 for reproducing signals therefrom.

Figure 21:
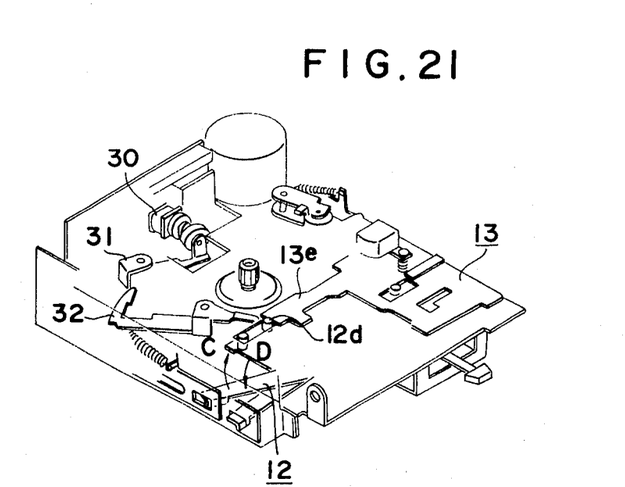

When an ejection button is depressed, or the magnetic tape has been completely wound upon the take-up reel, operating currect to solenoid 30 is turned OFF so that key lock lever 32 is no longer restrained by solenoid joint link 31 and accordingly chassis back lever 12 is no longer restrained from its pivotal movement. Sliding plate 8, which is no longer restrained by chassis back lever 12, is therefore shifted rearward of cassette holder 2 by the elastic force of spring 21 to thereby rotate chassis back lever 12 in the direction indicated by arrow C in FIGS. 15, 21 and 22. Accordingly, engaging pin 12d of chassis back lever 12 pushes against the extended arm 13e of head chassis assembly 13, to bias head chassis assembly 13 to the right, as viewed in FIG. 19, until stopper portion 15a of leaf spring 15 once again engages surface 13d of head chassis assembly 13 to lock the latter in its operative position, shown by solid lines in FIG. 19. Also, the pinch roller assembly is returned to its initial position by projection 13f.

Figure 22:
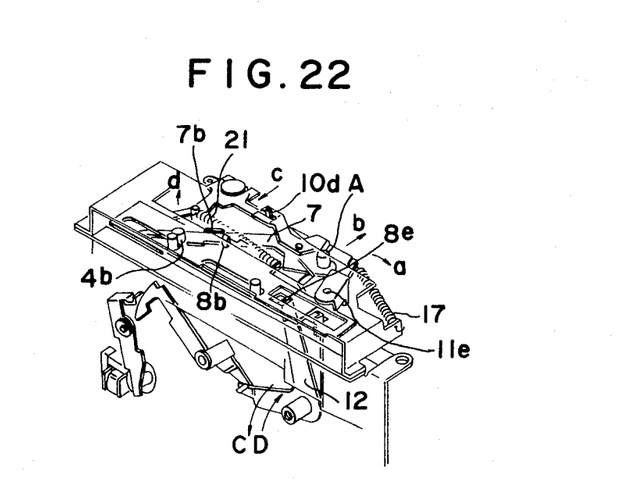

At this time, engaging lug 8b of sliding plate 18, during its rearward movement, engages the underside of engaging lug 7b of joint lever 7, as shown in FIG. 22, to bias cut-out portion 7c of joint lever 7 out of engagement pin 4b of threading arm 4. Accordingly, rotatable lever 6 is rotated back to its initial position about pin 11e, as indicated by arrow a in FIG. 22, by means of spring 17. With such rotation of rotatable lever 6, torsion spring 18 no longer biases engaging lug 2c of cassette holder 2. Further, during such rotation, engaging lug 6e of rotatable lever 6 is rotated into engagment with the underside of engaging lug 2c to bias cassette holder 2 upward to its first loading position, wherein cut-out 3c once again mates with engaging portion 2c to lock cassette holder 2 into the first loading position. In other words, during such rotation of rotatable lever 6, pin 1d moves upwardly to bias end 10b of guide lever 10 in the same direction, as indicated by arrow b in FIG. 22. Accordingly, bifurcated section 10d and, in particular, upper fork arm 10c thereof, biases projection 5c of release lever 5 in the direction of arrow c as viewed in FIG. 22, to disengage engaging portion 5e from pin 4c of threading arm 4. Release lever 5 is therefore rotated in the direction indicated by arrow d in FIG. 22 against the force of spring 20, and is translated to the right within cut-out 11j, as viewed in FIG. 10, by means of tension spring 20. Since release arm 5b no longer engages actuating portion 3c, holder lever 3 is rotated back to its original position by the torsion spring associated therewith so that cut-out 3c once again mates with engaging portion 2c. Also, since pin 4c of threading arm 4 no longer mates with engaging portion 5e, threading arm 4 is rotated in the clockwise direction, as viewed in FIG. 1A, by the torsion spring associated therewith. In addition, sliding plate 8, at such time, is returned to its original unbiased position, along with chassis back lever 12 (in the direction of arrow D in FIG. 22) by means of spring 16 attached between main chassis 1 and sliding plate 8. Threading arm 4 is also returned to its original position by means of spring 21 extending between sliding plate 8 and threading arm 4. During the return movement of threading arm 4, roller 4f pushes sliding member 2h of cassette holder 2 to its original position so as to eject the cassette from cassette holder 2. However, since the cassette is still held between upper and lower surface plates 2h₁ and 2h₂, the cassette does not drop out from cassette holder 2, but rather, must be pulled out by the operator.

Having described a specific preferred embodiment of the invention with reference to the accompanying drawings, it is to be understood that the present invention is not limited to that precise embodiment, and that various changes and modifications may be effected therein by one skilled in the art without departing from the scope or spirit of the invention as defined in the appended claims.

What is claimed is:

1. A cassette loading and unloading mechanism for use in an information signal recording and/or reproducing apparatus, comprising:
   support means;
   cassette holding means mounted on said support means and adapted to move between a first loading position and a second operative position, wherein a cassette is adapted to be inserted into said cassette holding means to a loaded position in response to a force applied to said cassette when said cassette holding means is in said first loading position;

retention means adapted to engage said cassette holding meeans to retain the latter in said first loading position;

first biasing means for biasing said cassette holding means to said second operative position from said first loading position when said retention means is disengaged from said cassette holding means; and means for disengaging said retention means from said cassette holding means only after the cassette has been inserted to said loaded position and the force applied to said cassette has been reduced below a first value.

2. A cassette loading and unloading mechanism according to claim 1; further including means for pivotally mounting said cassette holding means on said support means so that said cassette holding means is adapted to pivotally move between said first loading position and said second operative position.

3. A cassette loading and unloading mechanism according to claim 1; in which said cassette holding means includes guide means for guiding the cassette when the latter is inserted into said cassette holding means.

4. A cassette loading and unloading mechanism for use in an information signal recording and/or reproducing apparatus, comprising:

support means;

cassette holding means mounted on said support means and adapted to move between a first loading position and a second operative position, wherein a cassette is adapted to be inserted into said cassette holding means to a loaded position in response to a force applied to said cassette when said cassette holding means is in said first loading position;

retention means adapted to engage said cassette holding means to retain the latter in said first loading position;

first biasing means for biasing said cassette holding means to said second operative position from said first loading position when said retention means is disengaged from said cassette holding means; and means for disengaging said retention means from said cassette holding means only after the cassette has been inserted to said loaded position and the force applied to said cassette has been reduced below a first value, said means for disengaging including threading arm means adapted to be biased from a first inactive position to a second active position by said cassette when the latter is inserted into said cassette holding means to said loaded position, release means for disengaging said retention means from said cassette holding means and adapted to be engaged by said threading arm means when the latter is biased to said second active position, and second biasing means for biasing said threading arm means from said second active position toward said first inactive position when said cassette has been inserted into said cassette holding means to said loaded position and when the force applied to said cassette has been reduced below said first value.

5. A cassette loading and unloading mechanism according to claim 4; in which said threading arm means is rotatably mounted on said support means to move between said first inactive position and said second active position and includes a first engaging member, said release means is mounted on said support means in a rotatable and linearly movable manner and includes a second engaging member adapted to engage with said first engaging member when said threading arm is biased to said second active position to couple said release means to said threading arm means, wherein said release means is biased with said threading arm means toward said first inactive position, when the force applied to said cassette has been reduced below said first value, to disengage said retention means from said cassette holding means.

6. A cassette loading and unloading mechanism according to claim 5; in which said cassette holding means includes a third engaging member and said retention means includes a holder lever pivotally mounted on said support means and including a fourth engaging member which is normally biased into engagement with said third engaging member to retain said cassette holding means in said first loading position; and said release means pivotally biases said fourth engaging member out of engagement with said third engaging member when said release means is biased toward said first inactive position with said threading arm means.

7. A cassette loading and unloading mechanism according to claim 4; in which said second biasing means includes sliding plate means, means for retaining said sliding plate means in a first stationary position when said cassette is inserted into said cassette holding means to said loaded position, and spring means connected between said sliding plate means and said threading arm means for biasing said threading arm means from said second active position toward said first inactive position when the cassette has been inserted into said cassette holding means to said loaded position and when the force applied to said cassette has been reduced below said first value.

8. A cassette loading and unloading mechanism according to claim 7; in which said means for retaining includes lever means for retaining said sliding plate means in said first stationary position, and solenoid means for controlling said lever means when said cassette is inserted into said cassette holding means to retain said sliding plate means in said first stationary position.

9. A cassette loading and unloading mechanism according to claim 8; in which said means for retaining includes switch means activated by said threading arm means, when the latter is moved from said first inactive position toward said second active position, to energize said solenoid means such that said lever means is controlled to retain said sliding plate means in said first stationary position.

10. A cassette loading and unloading mechanism according to claim 1; in which said apparatus includes transducer means for at least one of recording and reproducing information signals from said record medium, chassis means for supporting said transducer means and being adapted to move between a remote position and a tape engaging position, latching means adapted to engage said chassis means to retain the latter in said remote position, and third biasing means for biasing said chassis means from said remote position to said tape engaging position when said latching means is disengaged from said chassis means.

11. A cassette loading and unloading mechanism according to claim 10; in which said cassette holding means includes an engaging member for disengaging said latching means from said chassis means when said cassette holding means is moved from said first loading position to said second operative position, wherein said third biasing means biases said chassis means to said tape engaging position.

12. A cassette loading and unloading mechanism according to claim 11; in which said first biasing means includes lever means for biasing said chassis means from said tape engaging position to said remote position when said cassette holding means moves from said second operative position to said first loading position.

13. A cassette loading and unloading mechanism according to claim 1; in which said first biasing means includes rotatable lever means and first spring means controlled by said rotatable lever means to apply a biasing force to said cassette holding means to move the latter from said first loading position to said second operative position when said retention means is disengaged from said cassette holding means.

14. A cassette loading and unloading mechanism for use in an information signal recording and/or reproducing apparatus, comprising:
   support means;
   cassette holding means mounted on said support means and adapted to move between a first loading position and a second operative position, wherein a cassette is adapted to be inserted into said cassette holding means to a loaded position in response to a force applied to said cassette when said cassette holding means is in said first loading position;
   retention means adapted to engage said cassette holding means to retain the latter in said first loading position;
   first biasing means for biasing said cassette holding means to said second operative position from said first loading position when said retention means is disengaged from said cassette holding means, said first biasing means including rotatable lever means and first spring means controlled by said rotatable lever means to apply a biasing force to said cassette holding means to move the latter from said first loading position to said second operative position when said retention means is disengaged from said cassette holding means;
   means for disengaging said retention means from said cassette holding means only after the cassette has been inserted to said loaded position and the force applied to said cassette has been reduced below a first value, said means for disengaging including threading arm means adapted to be biased from a first inactive position to a second active position by said cassette when the latter is inserted into said cassette holding means to said loaded position; and
   said first biasing means further including joint lever means for releasably connecting said rotatable lever means to said threading arm means, wherein said rotatable lever means is moved with said threading arm means, when the latter is moved from said first inactive position to said second active position, to control said first spring means to apply said biasing force to said cassette holding means, and second spring means for biasing said rotatable lever means so that said first spring means does not apply said biasing force to said cassette holding means, when said threading arm means is in said first inactive position.

* * * * *